UNITED STATES PATENT OFFICE.

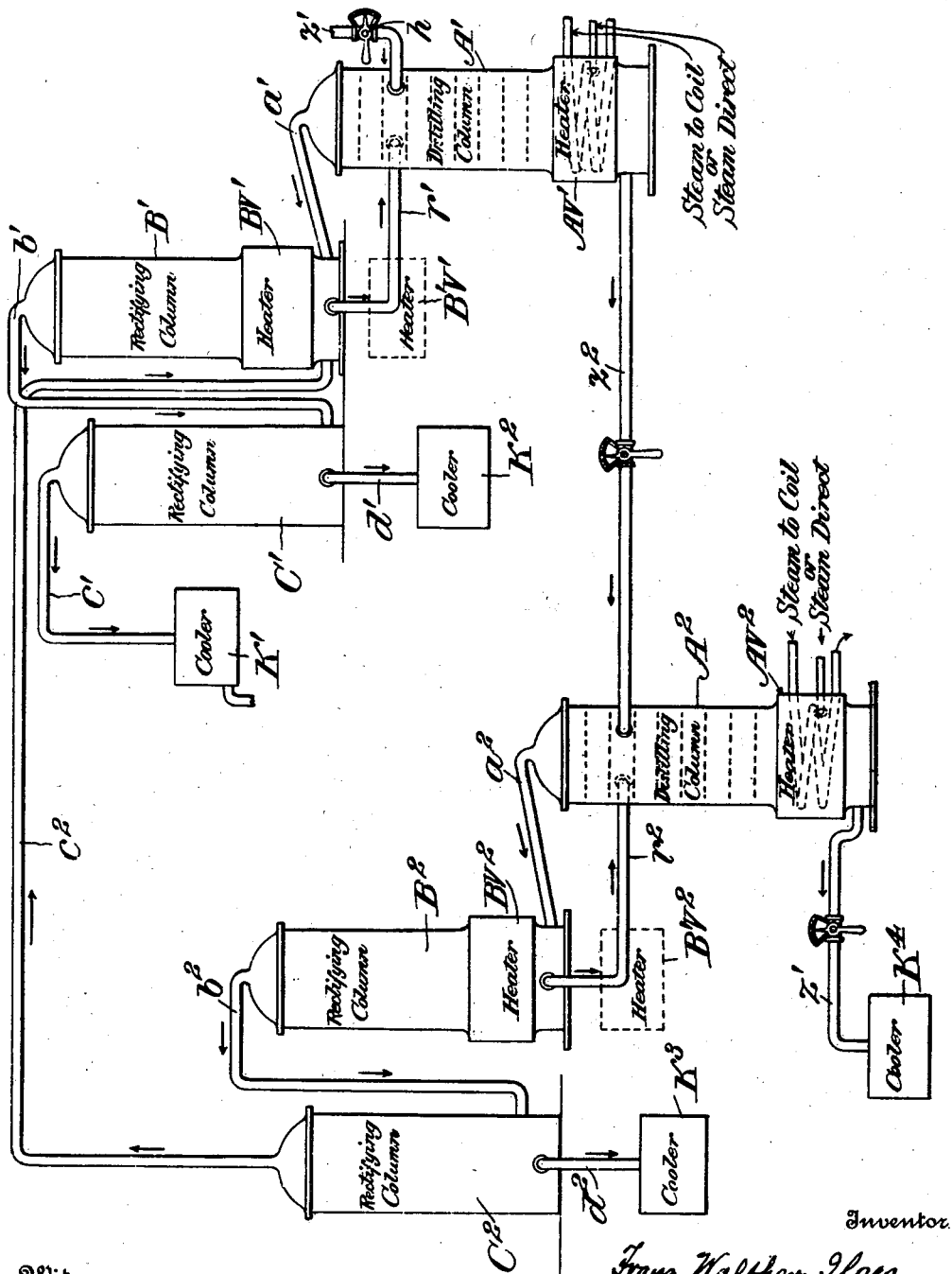

FRANZ WALTHER ILGES, OF COLOGNE-BAYENTHAL, GERMANY.

APPARATUS FOR THE UNINTERRUPTED SEPARATION OF CONSTITUENTS.

968,478.  Specification of Letters Patent.  Patented Aug. 23, 1910.

Application filed May 4, 1909. Serial No. 493,978.

*To all whom it may concern:*

Be it known that I, FRANZ WALTHER ILGES, a subject of the German Emperor, and resident of Cologne - Bayenthal, Germany, have invented certain new and useful Improvements in Apparatus for the Uninterrupted Separation of Constituents, of which the following is a specification.

The apparatus of the present invention consists in the use of several distilling and rectifying columns in a certain arrangement and succession.

In the drawing—the figure is a diagrammatic representation of the apparatus.

Referring to the figure, $A^1$ and $A^2$ are distilling columns provided in their lower parts with the heaters $AV^1$ and $AV^2$. These heaters are preferably heated by steam passing through a coil of pipes in the well-known way, though if the character of the fluids to be separated permits, steam may be introduced directly into such fluids. The columns $B^1$, $C^1$, $B^2$ and $C^2$ are rectifying columns consisting of dephlegmators and rectifiers, which do not require any special condensers; but it is evident that any other form of rectifying column may be used. The two rectifying-columns $B^1$ and $B^2$ are each provided in their lower part with evaporators $BV^1$ and $BV^2$, each having a system of steam-heated pipes or other steam-heated surfaces therein; these evaporators being arranged in such manner that the condensate flows over the heating surfaces of the evaporators and thence back through the pipes $r^1$ or $r^2$ into the distilling columns. These evaporators may however also, without their action being thereby impaired, be fitted, as shown in dotted lines at $B'V'$ and $B'V^2$, into the said pipes $r^1$ and $r^2$ through which the condensate returns, instead of into the rectifying-columns themselves. In the pipes $z^1$, $z^2$ and $z^3$ for the fluid there is provided, in each one, an adjusting cock with a scale. Finally, the apparatus is provided with the four coolers $K^1$, $K^2$, $K^3$ and $K^4$.

The apparatus is designed and adapted for use in the continuous separation of constituents of different boiling points from complex mixtures, such as benzene (benzol), toluene, petroleum, etc.

In the usual rectifying column, the vapors produced by the boiling of the liquid which is being rectified, rise upward through the column, and meet the condensate moving in the opposite direction, and there is an exchange between the less easily volatilized constituents of the vapor and the more easily volatilized constituents of the condensate.

In the present invention the recovery of the separate constituents of the mixture in a pure state is divided into stages.

Instead of attempting to directly obtain a pure product without any admixtures of more or less volatile constituents, this new process tries in the first place to solve the much easier problem of purifying by rectification the raw vapors in such a manner that the portion remaining in the form of vapor consists only of the two or more most volatile constituents without any less volatile constituents. Such a process can be carried on continuously without any difficulty, if the conditions are such that the presence in the condensate from the rectifying column, of traces of the more volatile constituents is not regarded as a disadvantage.

The second part of the problem consists only in recovering from the preparatorily-rectified vapors, consisting only of two constituents, that one which has the higher boiling point, as a pure, final product, this separation being easily effected by means of a second special rectifying column.

The following description of the mode of operation of the apparatus illustrated in the drawing will enable the process to be clearly understood.

The apparatus illustrated in the drawing serves to separate a mixture of fluids containing four constituents of different boiling-temperatures, which may be designated 1, 2, 3 and 4, 1 being the most volatile and 4 the least volatile constituent. The raw mixture of fluids consisting of these four constituents is introduced in an uninterrupted stream, preferably by a fluid-regulator not shown in the drawing, through the pipe $z^1$, provided with an adjusting-cock $h$, into the upper part of the distilling-column $A^1$. This column has near its bottom a heater $AV^1$, by which the fluids are thoroughly boiled, the generated vapors passing upwardly in contact with the incoming fluid mixture, which is thereby preparatorily rectified, losing as it descends more and more of its very volatile constituents, while the ascending vapors give up their less volatile constituents to the fluid. In this way the preparatory separation can be energetically and thoroughly carried out, so that the fluid in passing out of the lower part of the column is quite free from constituent 1 and contains only insignificant traces of constituent 2, while the vapors coming out of the hood of the distilling column A¹ through the pipe a¹ are quite free of constituent 4 and consist of the whole of constituent 1, the greater part of constituent 2, and a small admixture of constituent 3. These vapors enter the bottom part of the rectifying-column B¹ and stream through the same from the bottom to the top; during this passage the vapors boil the condensate, formed in the upper part of the column out of themselves, and they effect in this way a very effective rectification, so that the less volatile constituents pass over into the condensate, the more volatile ones into the vapors. It is not difficult to so control the operation that the vapors passing out at the top of the column B¹ through the pipe b¹ consist only of the pure constituents 1 and 2, while the condensate flowing down in the column consists of constituent 3 with an admixture of constituent 2; this condensate is, after passing through evaporator BV¹, conducted back into the distilling column A¹, through the pipe r¹, to be treated anew, while the vapors passing out of the hood of B¹ are conducted through the pipe b¹ into a second rectifying-column C¹. In this second rectifying column C¹, the process is repeated, with the difference that in this column the procedure is so conducted that by the rectification, the greater part of the constituent 2 flows, as a fluid condensate, free from any admixture of the most volatile constituent 1, from the lower part of the column C¹ through the pipe d¹, into the cooler K², as a finished pure, final product, while the vapors passing out of the column C¹, through the pipe c¹ in the hood at the top, into the cooler K¹, consist only of the pure constituent 1 mixed with a small part of constituent 2. The treatment of this "first foreflow," as recovered in the cooler K¹, to obtain constituent 1, pure and unmixed, is the subject of a special process and need not here be further described.

As has been described above, the preparatorily-cleaned fluid passing out of the distilling-column A¹ through the pipe z² consists only of constitutents 3 and 4 with a small admixture of constituent 2. This "first afterflow" passes for a further treatment into the second part of the apparatus, which, exactly the same as the first, consists of a distilling-column A² and two rectifying-columns B² and C². The first afterflow passes into the upper part of the distilling-column A² and through the same from the top to the bottom; by the vapors developed out of this first afterflow in the heater AV² is effected a preparatory depurating of the fluid in the same manner as with the distilling-column a¹. The "second afterflow" passing out of the column A² at the bottom consists only of the pure constituent 4 mixed with slight traces of constituent 3, and is conducted through the pipe z³ into the cooler K⁴, in order to be submitted later on to an after-treatment, for separating the pure, unmixed constituent 4, which is likewise no part of the present invention. The vapors passing out of the hood of the column A² through the pipe a² consist of constituent 3, with admixtures of constituents 2 and 4. They enter the rectifying-column B², in which, by rectification, a separation takes place in such a manner that the condensate which, after passing through the evaporator BV², is conducted back through the pipe r² into the distilling-column A² for a further treatment, is perfectly freed from constituent 2 and consists only of constituents 3 and (in small quantities) 4, while the vapors passing from the hood of the rectifying-column B² into the rectifying-column C² are perfectly freed from constituent 4 and consist exclusively of the pure constituent 3 with a slight admixture of constituent 2. In the rectifying-column C² is then repeated the process described with regard to the column C¹. From this column, the unmixed constituent 3, as a pure, final product, flows through the pipe d² into the cooler K³, while from the hood of the column C² passes out, through the pipe c², a "second foreflow" consisting of the complete remainder of constituent 2 with an admixture of constituent 3, which has remained in the vapors. This second foreflow is however not recovered like the first foreflow and the second afterflow, as an imperfectly-rectified intermediate product, but is returned in the form of vapor to the first rectifying column B¹ for a further treatment.

The process thus makes it possible to recover in an uninterrupted process the two constituents of the raw fluid intermediate as to their boiling temperatures, as pure final products without any admixtures. The apparatus illustrated in the drawing may, of course, be enlarged by any number of main parts consisting each of one distilling-column and two rectifying-columns according to the number of constituents to be separated in a pure state out of a raw fluid by means of this process.

The arrangement of the apparatus by which any number of similar units, each consisting of one distilling column and two rectifying columns, are connected together is new,—as is also the method of recovering pure, final products by rectification of intermediate products, obtained by preparatory rectification in a distilling and rectifying column.

As will be seen from the above description, the condensates formed in the rectifying columns B¹, B² are uninterruptedly returned for further treatment to the distilling-columns A¹, A².

In the treatment of fluids which evaporate at a low temperature, there is the drawback that owing to exterior cooling there is formed in the rectifying-columns a greater quantity of condensate than required for the rectification. It may easily happen that the rectifying-columns do not possess the amount of heat required for doing their work, so that it is difficult to keep the depurated vapors in a vaporous state. This difficulty is remedied by the provision of an evaporator in the lower part of the rectifying column, which furnishes a sufficient quantity of heat to insure a thorough vaporization of the fluid under treatment, so that a well-purified condensate only is returned to the distilling column.

The use of heaters for the purpose of evaporating fluids in distilling or rectifying-columns is known *per se*. But what is new is this intercalation of an evaporator into the return-conduit for the condensate formed in a rectifying-column, through which it returns into a distilling-column intended for treating this condensate for the purpose of returning a part of the same in the form of vapor to the rectifying-column.

The use of regulatable adjusting cocks is a feature which facilitates an undisturbed and uninterrupted working. In prior distilling columns, the outflow of the residual fluid from the distilling column has always been through an overflow-pipe, whose height is such that it corresponds with the pressure of the fluid during the process. When the outflow of the residue is controlled in this way, the latter will continuously flow out in quantity corresponding to that of the fresh supply admitted to the distilling-column, less that part of the fresh supply which is evaporated by the distilling-column. On the supposition that the quantity of fresh supply and that the quantity of heat conveyed to the distilling-column remain always uninterruptedly uniform, and that also the working of the rectifying-column connected with the distilling column is not subject to any fluctuations, the residue passing out of such an overflow-pipe will always be of the same composition. By regulating the whole process by the systems already known, it would therefore be possible, on the supposition that outside disturbances cannot occur, to obtain uninterruptedly a residue consisting only of pure, non-volatile ingredients, by means of the device of a simple overflow-pipe. But this supposition of always avoiding disturbances in the working ways cannot possibly be fulfilled. Even when using the best automatically-working fluid and pressure regulators, it cannot be prevented that through the inattention of the man in charge of the working or through outside disturbances, the conditions under which the process is carried out will sometimes be abnormal. While it is possible when such disturbances occur, to regulate or readjust at once the working of the whole plant, for the purpose of preventing deterioration of the final product of the rectifying-column, this could not be accomplished without influencing the quality of the less volatile constituents coming from the distilling column. This drawback is excluded by the new arrangement which consists in providing in the pipe through which the residue flows off from the distilling-column, an adjusting-cock, preferably provided with a scale. This cock is during the process so adjusted that it only allows such quantity of the residue to pass out of the distilling-column as will enable the desired composition of the residue to be obtained, which may be ascertained by taking samples and testing.

I claim:—

1. A system for the continuous separation from fluid mixtures of constituents of different boiling points, comprising (1) a distilling column provided with a conduit for delivering the vaporized products therefrom; (2) a rectifying column to which said conduit is connected, said rectifying column having an evaporative heater and a conduit leading from its lower portion to said distilling column and a conduit for delivering the vaporized products from its upper portion; and (3) a second rectifying column to which said last-mentioned conduit is connected, provided with means for collecting the vaporized product and the condensate.

2. A system for the continuous separation from fluid mixtures of constituents of different boiling points, comprising (1) a distilling column provided with valved inlet and outlet pipes, and a conduit for delivering the vaporized products therefrom; (2) a rectifying column to which said conduit is connected, said rectifying column having an evaporative heater and a conduit leading from its lower portion to said distilling column and a conduit for delivering the vaporized products from its upper portion; and (3) a second rectifying column to which said last-mentioned conduit is connected, provided with means for collecting the vaporized product and the condensate.

3. The combination with (1) a system comprising a distilling column, a rectifying column having an evaporative heater, and a second rectifying column all connected in series, of (2) a second system comprising a distilling column, a rectifying column having an evaporative heater, and a second rectifying column all connected in series, and (3) a conduit provided with a regulating valve, connecting the two distilling columns for delivering the afterflow of the first column to the second column.

4. The combination with (1) a system comprising a distilling column, a rectifying column having an evaporative heater, and a second rectifying column all connected in series, of (2) a second system comprising a distilling column, a rectifying column having an evaporative heater, and a second rectifying column all connected in series, (3) a conduit provided with a regulating valve connecting the two distilling columns for delivering the afterflow of the first column to the second column, and (4) a conduit connecting the vapor escape of the final rectifier of the second system with the first rectifying column of the first system.

5. The process of treating a complex liquid to separate constituents of different boiling points, which consists in heating the liquid in a distilling column to vaporize a portion thereof, conveying the vaporized portion to a rectifying column and there heating it to evaporate a part of the condensate, returning the unevaporated portion of the condensate to the distilling column and conveying the vaporized portion to a second rectifying column, collecting the condensate therefrom and separately condensing the vaporized portion.

In testimony whereof I have signed my name to this specification in the presence of two subscribing witnesses.

F. WALTHER ILGES.

In presence of—
CHARLES LESIMPLE,
BESSIE F. DUNLAP.